(12) United States Patent
Gleyse

(10) Patent No.: US 8,888,040 B2
(45) Date of Patent: Nov. 18, 2014

(54) SYSTEM FOR OPENING AND CLOSING THE DOOR OF AN AIRCRAFT LANDING GEAR COMPARTMENT

(75) Inventor: Gilbert Gleyse, Ceaux en Couhe (FR)

(73) Assignee: Airbus Operations SAS, Toulouse (FR)

( * ) Notice: Subject to any disclaimer, the term of this patent is extended or adjusted under 35 U.S.C. 154(b) by 328 days.

(21) Appl. No.: 13/002,158

(22) PCT Filed: Jul. 6, 2009

(86) PCT No.: PCT/FR2009/051326
§ 371 (c)(1),
(2), (4) Date: Dec. 30, 2010

(87) PCT Pub. No.: WO2010/004200
PCT Pub. Date: Jan. 14, 2010

(65) Prior Publication Data
US 2011/0127376 A1    Jun. 2, 2011

(30) Foreign Application Priority Data
Jul. 8, 2008  (FR) ...................................... 08 54627

(51) Int. Cl.
*B64C 25/10*  (2006.01)
*B64C 25/16*  (2006.01)
*B64C 25/22*  (2006.01)

(52) U.S. Cl.
CPC ................ *B64C 25/16* (2013.01); *B64C 25/22* (2013.01)
USPC ..................................................... 244/102 A

(58) Field of Classification Search
USPC .................... 244/102 R, 102 A, 103 R, 129.4
See application file for complete search history.

(56) References Cited

U.S. PATENT DOCUMENTS

| | | | | |
|---|---|---|---|---|
| 2,552,843 A | * | 5/1951 | Clifton et al. | 244/102 R |
| 3,107,886 A | * | 10/1963 | Bossler, Jr. | 244/102 R |
| 4,408,736 A | * | 10/1983 | Kirschbaum et al. | 244/100 R |
| 4,568,045 A | * | 2/1986 | Mayer | 244/102 R |
| 6,345,786 B1 | * | 2/2002 | Sakurai | 244/102 R |
| 6,409,121 B1 | * | 6/2002 | Lindahl | 244/100 R |
| 6,854,689 B1 | * | 2/2005 | Lindahl et al. | 244/102 R |
| 7,287,726 B2 | * | 10/2007 | Briancourt | 244/102 R |
| 7,810,755 B2 | * | 10/2010 | Reynes | 244/104 FP |
| 8,028,954 B2 | * | 10/2011 | Leutard et al. | 244/102 R |
| 8,074,930 B2 | * | 12/2011 | Sibley | 244/129.5 |

FOREIGN PATENT DOCUMENTS

DE    733 010 C    3/1943
GB    653 132 A    5/1951

OTHER PUBLICATIONS

International Search Report issued Jan. 28, 2010, in PCT/FR2009/051326.

* cited by examiner

*Primary Examiner* — Tien Dinh
*Assistant Examiner* — Keith L Dixon
(74) *Attorney, Agent, or Firm* — Oblon, Spivak, McClelland, Maier & Neustadt, L.L.P.

(57) ABSTRACT

A system for opening and closing a door for a landing gear compartment of an aircraft includes a connection between the landing gear and the door with a first system forming an actuator mounted on the landing gear and a second system forming an actuator mounted on the door. The two systems form actuators connected to each other by at least one fluid communication device such that actuating the first system causes the actuation of the second system.

12 Claims, 5 Drawing Sheets

(12)    United States Patent    US 8,888,040 B2

SYSTEM FOR OPENING AND CLOSING THE DOOR OF AN AIRCRAFT LANDING GEAR COMPARTMENT

TECHNICAL FIELD

The present invention concerns a system for opening and closing the door of an aircraft landing gear compartment.

BACKGROUND OF THE INVENTION

The landing gear compartment is used to housing landing gear on any type of aircraft, in particular when the landing gear is placed under the fuselage of the aircraft.

Usually, this landing gear compartment is closed by several doors. For example, and in reference to FIG. 1, the compartment 20 for the front landing gear 30 is in particular closed by:
the front doors 40, which open during the descent of the gear 30, in particular to allow the leg 31 thereof to pass, and close after the exit of the gear 30 so as to preserve the aerodynamism of the fuselage 11 of the aircraft 10, and the back doors 50, which open during the descent of the gear 30 and remain open as long as the gear 30 is out.

A landing gear door is usually formed by a single-piece rigid panel. This panel is generally hinged on the aircraft structure around a pivoting axis offset towards the inside of the gear compartment in relation to said panel. More precisely, the panel is mounted secured to the gear, such that the exit and return of the gear cause the opening and closing of the panel, respectively.

The pivoting of the door is usually obtained via a direct mechanical connection between the door and the gear.

The direct connection consists of a single connecting rod mounted, on one hand, on the landing gear, for example on the leg, the beam or the strut, and on the other hand on the door. Thus, when the gear comes out, it pivots around an axis causing the movement of the connecting rod, which makes the door pivot into its opening position. In parallel, the return of the gear into the compartment causes the door to close.

The use of a single connection does, however, have the drawback of presenting a limited freedom of positioning of the connecting rod, implying significant design constraints.

Indeed, the connecting rod must be mounted on the gear on one hand and on the door on the other.

Among these constraints, we sometimes see the obligation to arrange the connecting rod inclined relative to the door, due in particular to the reduced space in the landing gear bay and the kinematics of the landing gear and the door.

One consequence is the low intensity of the restoring moment exerted by the connecting rod on the door, when the door is in the closed position. The door indeed undergoes very significant aerodynamic stresses that the connecting rod cannot completely balance.

Thus, to pick up the stresses undergone by the door, the fittings attaching the door to the structure of the compartment, for example goosenecks, are reinforced and then have large dimensions. The problems of mass and bulk then arise.

Moreover, before the landing gear comes out and when the front doors are open, the air rushes into the landing gear compartment and also exerts a very significant stress on the back doors.

The back doors vibrate greatly, which causes, aside from noise problems, premature fatigue of the doors and the corresponding connecting rods.

BRIEF DESCRIPTION OF THE INVENTION

The invention mainly relates to a system for opening and closing a door of the landing gear compartment, the original design of which grants it great freedom of positioning.

The system for opening and closing a door includes connecting means between the landing gear and the door designed to ensure the opening of the door when the gear comes out and the closing of the door when the gear goes back in.

According to the invention, the connecting means includes a first system forming an actuator mounted on the landing gear and a second system forming an actuator mounted on the door, the two systems forming actuators being connected to each other by at least one fluid communication means such that the actuation of the first system forming an actuator causes the actuation of the second system forming an actuator.

Thus, the system according to the invention has great positioning freedom and then makes it possible to adapt to the kinematic constraints and space management constraints in the landing gear compartment.

Indeed, the door is not directly connected to the landing gear, but rather indirectly connected, via two systems forming actuators connected to each other by fluid communication means.

This indirect connection offers an additional degree of freedom relative to the direct connection of the prior art.

The system according to the invention indeed has two axes of translation corresponding to the natural axis of translation of each of said systems forming actuators themselves. These axes of translation are not necessarily oriented in a required position. Indeed, only a fastening point is defined for each system forming an actuator, the fastening point on the landing gear for the first system forming an actuator and the fastening point on the door for the second. Each system forming an actuator therefore has the freedom to be oriented in a suitable direction.

As a result, it is in particular possible to mount the second system forming an actuator with an orientation that allows it to balance the aerodynamic stresses undergone by it.

Thus, the second system forming an actuator can also be mounted on the landing gear compartment.

The second system forming an actuator can be arranged substantially perpendicular, locally, to the door when said door is closed.

The aerodynamic stresses exerted on the door are then balanced by the second system forming an actuator. It is no longer necessary to reinforce or oversize the goosenecks, which makes it possible to meet the mass and bulk requirements specific to aeronautics.

Moreover, the system according to the invention has the advantage of not making the actuation of the door by dedicated control means more complex. Indeed, the actuation of the second system forming an actuator is controlled by the actuation of the first system forming an actuator, and not by additional means.

Advantageously, the systems forming actuators are two-way cylinders.

According to an embodiment of the invention, each cylinder of said systems forming actuators includes a front chamber and a back chamber, the front chamber receives a so-called actuating rod. A first pipe ensures the fluid communication between said front chambers and a second pipe ensures the communication between said back chambers.

In another embodiment of the invention, the first pipe ensures the fluid communication between the front chamber of the first system forming an actuator and the back chamber of the second system forming an actuator and the second pipe ensures the communication between the back chamber of the first system forming an actuator and the front chamber of the second system forming an actuator.

Preferably, the pipes are flexible.

The actuators can have a double rod.

Each actuator preferably comprises a fastening portion that extends along the axis of symmetry of the cylinder from the back chamber.

Each system forming an actuator can comprise a volumetric compensator.

Advantageously, the first system forming an actuator, the second system forming an actuator and the fluid communication means together form at least one closed fluid circuit. The closed fluid circuit(s) thus formed do not fluidly communicate with the handler device of the landing gear, the latter ensuring the exit and return of the landing gear.

The invention also concerns an aircraft including a system for opening and closing a door having any one of the features just defined.

Other advantages and features of the invention will appear in the non-limiting detailed description below.

BRIEF DESCRIPTION OF THE DRAWINGS

We will now describe, as non-limiting examples, embodiments of the invention, in reference to the appended drawings, in which:

FIG. 2 is a perspective view of the system for opening and closing a door according to one embodiment of the invention, for which the landing gear is in;

DETAILED DESCRIPTION OF THE INVENTION

Figure 1:
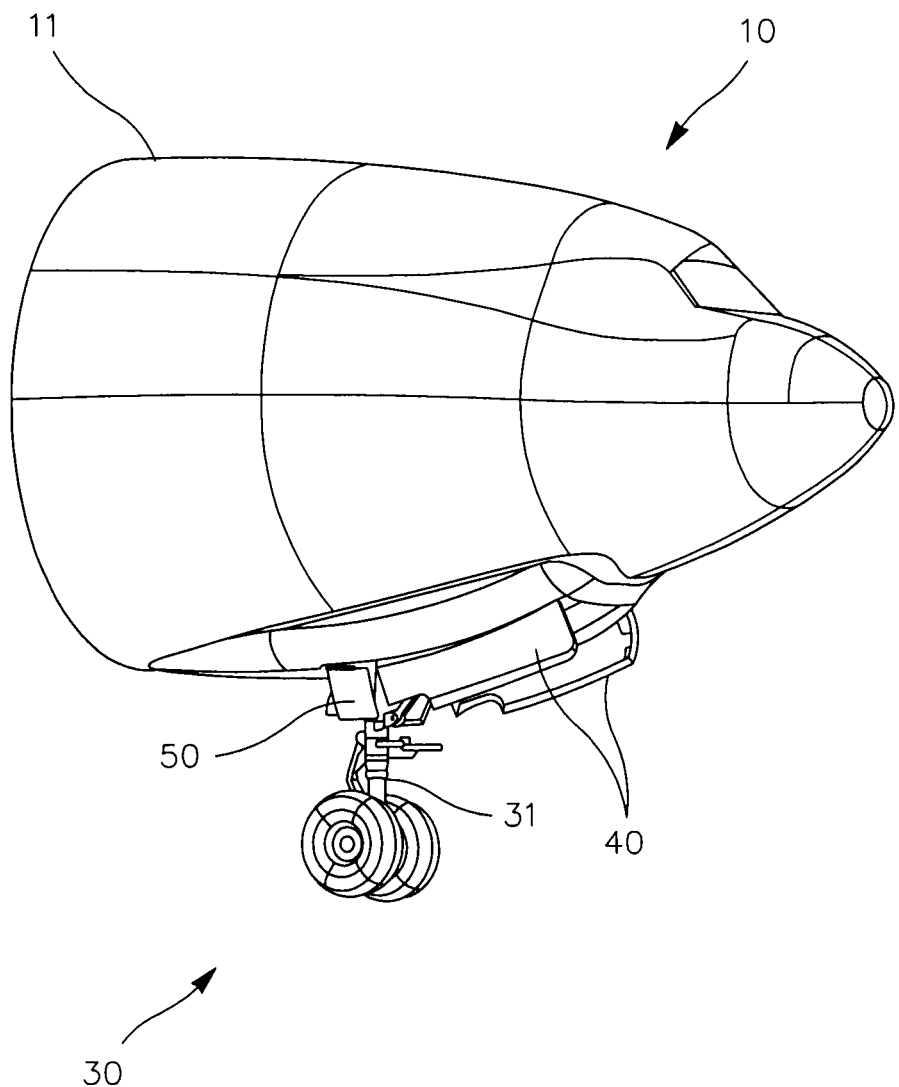
FIG. 1, already described, is a general perspective and side view of the front of an aircraft whereof the front landing gear is out.
Figure 2:
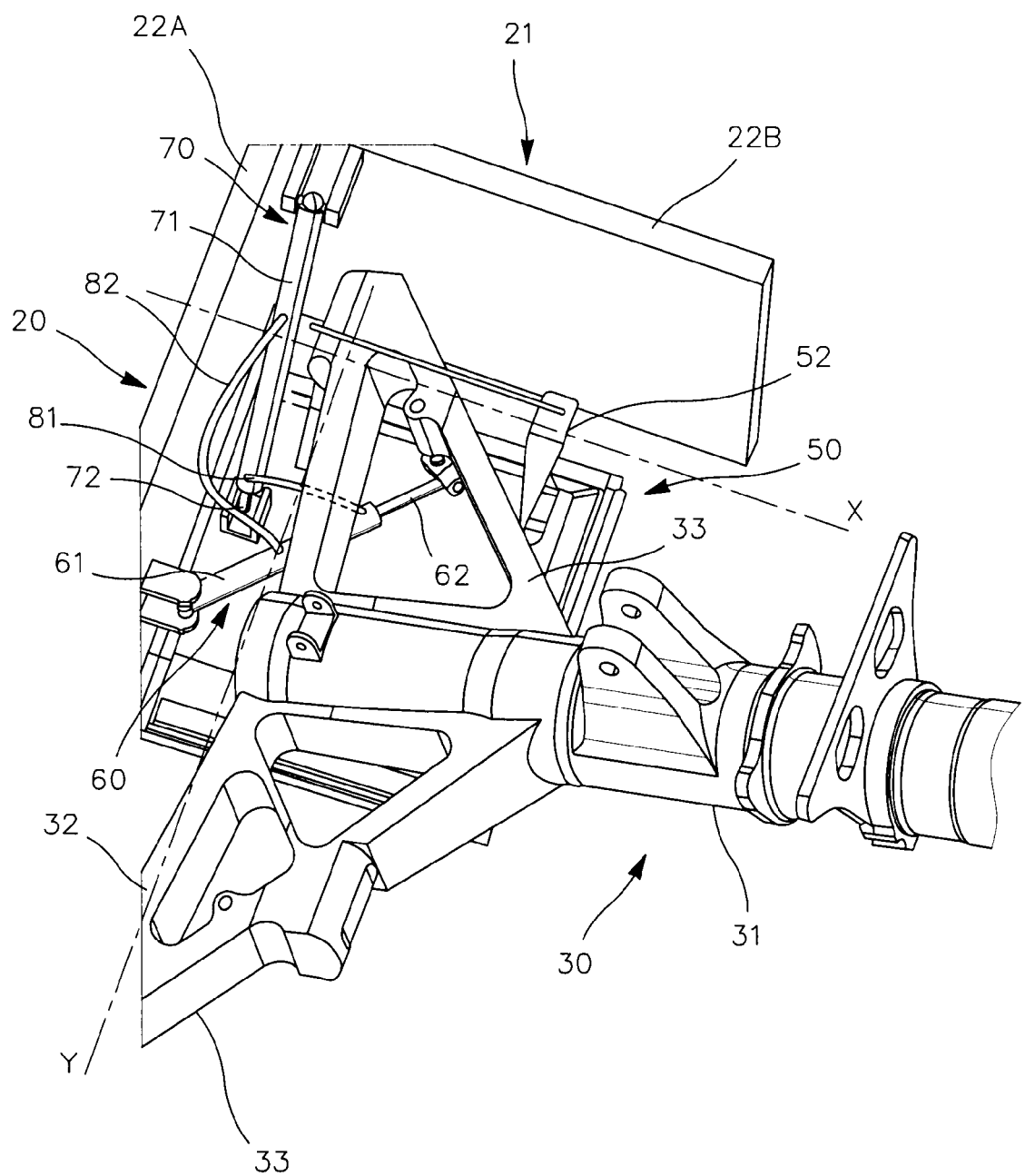
Figure 3:
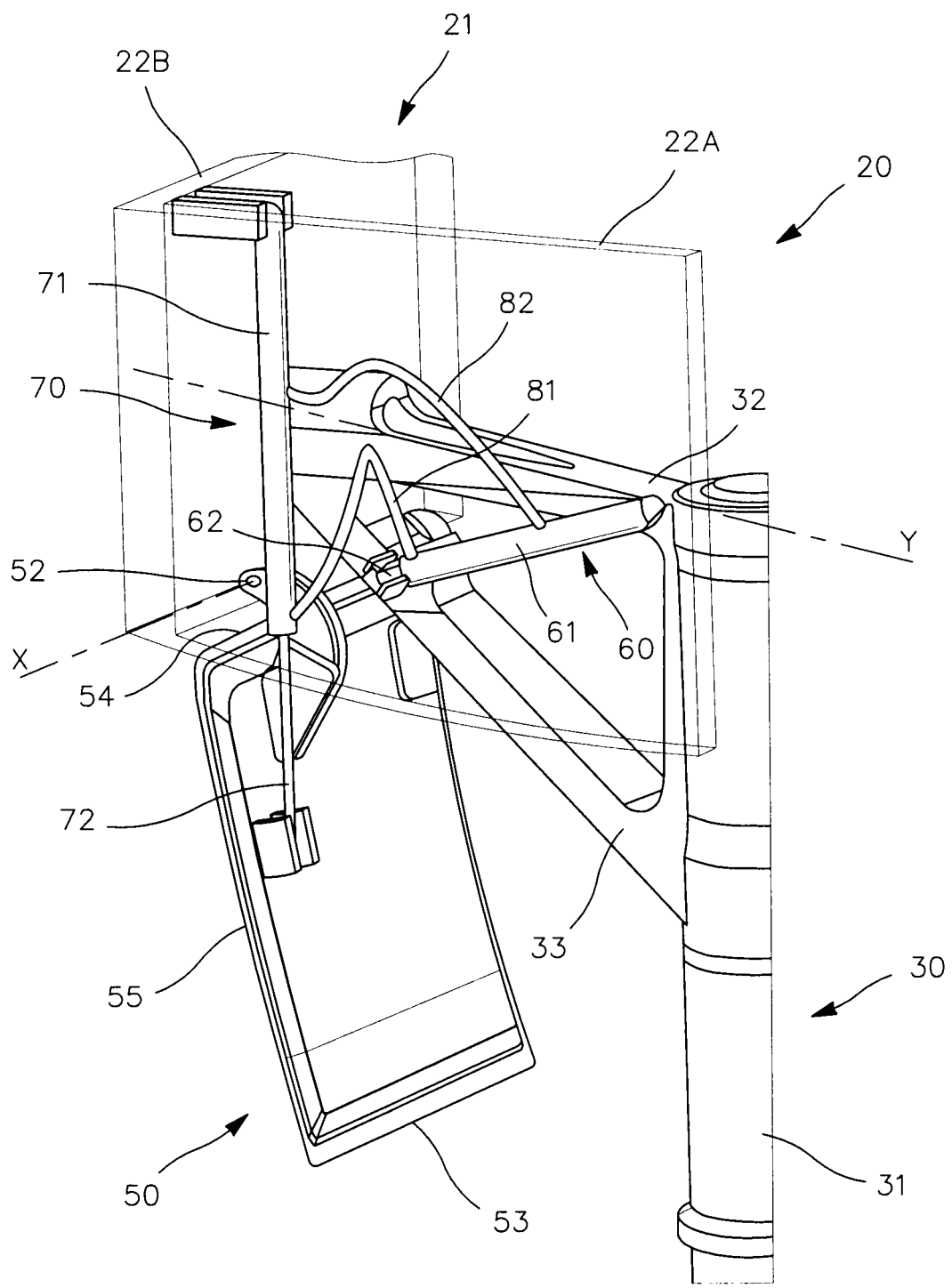
FIG. 3 is a perspective view of the system for opening and closing the door according to the preceding embodiment of the invention, for which the landing gear is out.

FIGS. 2 and 3 show perspective views of the system for opening and closing a door according to one embodiment of the invention, when the landing gear is in and out, respectively. The landing gear is not shown in its entirety so as to simplify the figures.

In this embodiment, the door 50 is a back door of the compartment 20 of the landing gear 30. The door 50 remains open as long as the landing gear is out. Moreover, its opening and closing movement is synchronized to the exit and return movement of the landing gear, respectively.

The landing gear compartment 20 includes a rigid structure 21 made up of at least one central wall 22A and side walls 22B, as well as a ceiling wall (not shown). The side walls 22B each support a back door 50.

The landing gear 30 in particular includes a leg 31 provided with a beam 32 whereof the ends are connected to the leg 31 by reinforcing arms 33. The beam 32 ensures the fastening of the landing gear 30 to the structure 21 of the compartment 20 and constitutes an axis of rotation Y of the leg 31.

A handler device of the landing gear 30 (not shown) is provided to ensure the exit and return of the landing gear 30.

The handler device can comprise a hydraulic handler actuator, connected to the leg 31, which can be actuated by a hydraulic pump.

At least one back door 50 is provided to close the landing gear 30 compartment 20 when the landing gear is in. A single door 50 is shown in FIGS. 2 and 3.

The door 50 is pivotably mounted on a side wall 22B via goosenecks 52. The pivoting of the door 50 is done around an axis of rotation X.

The axis of rotation X is substantially orthogonal to the axis of rotation Y. The axis of rotation X of the door is substantially parallel to the longitudinal axis of the aircraft.

The system for opening and closing the door 50 according to the invention includes a first system forming an actuator 60, called landing gear actuator, and a second system forming an actuator 70, called door actuator.

Each actuator 60 and 70 comprises an actuator body 61, 71 and an actuating rod 62, 72. The actuating rod moves in translation relative to the actuator body 61, 71 along an axis of symmetry of the actuator body. The structure of the actuators 60 and 70 is described in detailed below.

The landing gear actuator 60 is mounted on one of the members of the landing gear 30, for example, the leg 31, the reinforcing arms 33, or the strut (not shown). In the embodiment illustrated in FIGS. 2 and 3, the landing gear actuator 60 is mounted on a reinforcing arm 33 via the end of the actuating rod 62.

The body 61 of the landing gear actuator 60 is preferably mounted on the structure 21 of the landing gear compartment 20, for example on the ceiling wall, or on the central wall 22A as illustrated in FIGS. 2 and 3.

The fastenings of the rod 62 and the actuator body 61 can be pivoting or like ball joint.

The door actuator 70 is mounted on the door 50 of the landing gear compartment 20. As shown in FIG. 3, it can be mounted on different locations of the door 50, for example substantially at the center of gravity of the door, or near an edge 53 opposite the fastening edge 54 of the goosenecks 52. These examples of locations for mounting the door actuator 70 make it possible to limit the effects of vibrations on the door 50. In the embodiment illustrated in FIGS. 2 and 3, the door actuator 70 is mounted via the end of the actuating rod 72 on the door substantially near a lateral edge 55.

Preferably, the actuating rod 72 is oriented substantially perpendicularly, locally, relative to the door 50, when said door is closed. It can be oriented so as to form, relative to the closed door 50, a solid angle substantially between 0 and for example 2 steradians.

The body 71 of the door actuator 70 is preferably mounted on the structure 21 of the landing gear compartment 20, for example on the ceiling wall, or on a side wall 22B as shown in FIGS. 2 and 3.

The fastenings of the rod 72 and the actuator body 71 can be pivoting or like ball joint.

Figure 4:
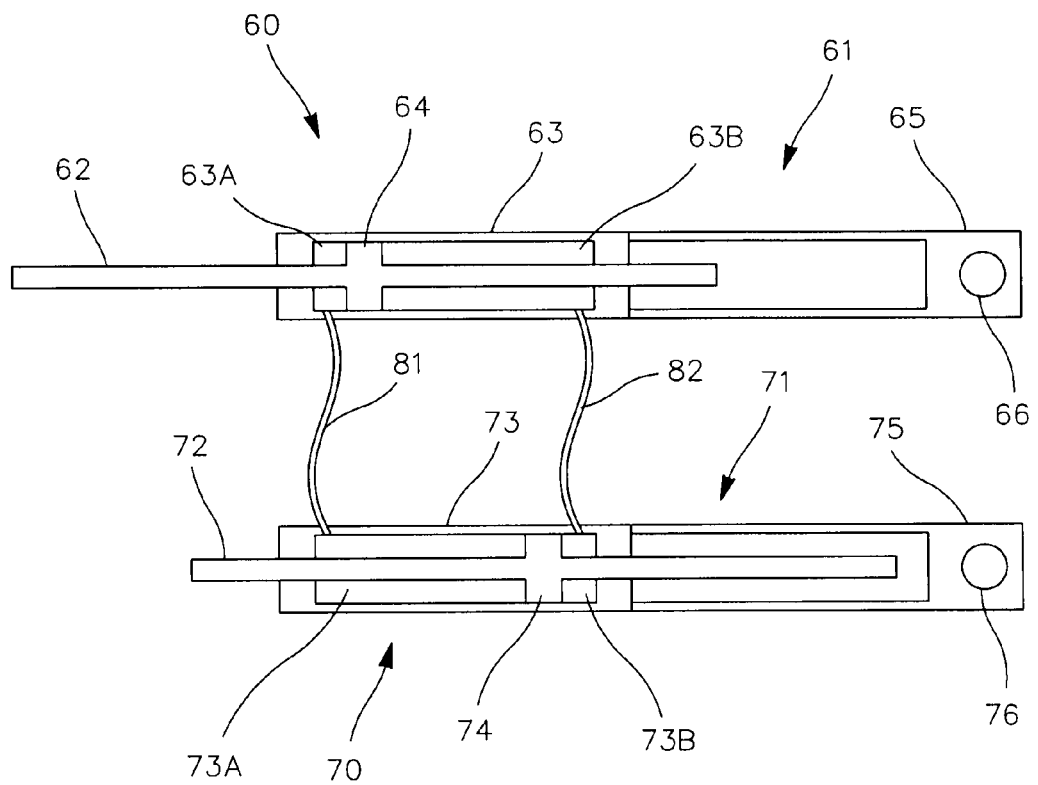
FIG. 4 is a diagrammatic cross-sectional illustration of two hydraulic actuators of the system for opening and closing the landing gear compartment door according to one embodiment of the invention.

In reference to FIG. 4, the body 61, 71 of the actuators 60 and 70 includes a cylinder 63, 73, inside which a piston 64, 74 moves connected to the actuating rod 62, 72. The piston 64, 74 thus defines two chambers sealed relative to each other, a so-called front chamber 63A, 73A and a so-called back chamber 63B, 73B. The front chamber 63A, 73A differs from the back chamber 63B, 73B in that it slidingly houses the actuating rod 62, 72.

In the embodiment of the invention, the actuator body 61, 71 also comprises a fastening portion 65, 75 that extends along the axis of symmetry of the cylinder 63, 73 from the back chamber 63B, 73B. The actuators 60 and 70 can be mounted, respectively, on the landing gear and on the door, at their fastening part 65, 75. Preferably, the fastening point 66, 76 is situated on the axis of symmetry of the cylinder 63, 73.

The actuators 60 and 70 are advantageously two-way cylinders. Thus, they can be actuated in an exit and return direction of the respective actuating rods 62, 72.

The actuators 60 and 70 are connected to each other such that the actuation of the landing gear actuator 60 causes the actuation of the door actuator 70. The actuation of the door actuator 70 is preferably automatic, i.e. directly controlled by the actuation of the landing gear actuator 60. Thus, it does not require additional control means relative to those ensuring the actuation of the actuator 60.

To connect the actuators 60 and 70 to each other, pipes 81, 82 are provided to ensure fluid communication between the front chambers 63A, 73A and back chambers 63B, 73B of the actuators.

The pipes are preferably flexible to adapt to the space management constraints of the landing gear bay 20.

In the example diagrammatically illustrated in FIG. 4, a first hose 81 connects the front chamber 63A of the landing gear actuator 60 to the front chamber 73A of the door actuator 70. A second hose 82 connects the back chamber 63B of the landing gear actuator 60 to the back chamber 73B of the door actuator 70.

The pistons 64, 74 are arranged in the cylinders 63, 73 such that the sum of the volumes of the front chambers 63A and 73A and the hose 81 is equal to that of the volumes of the back chambers 63B and 73B and the hose 82. The volume of the hoses 81 and 82 may be overlooked before the volumes of the chambers.

Moreover, it is advantageous to use actuators 60 and 70 with double rods to ensure the equality of the maximum volumes of the front chambers 63A, 73A and back chambers 63B, 73B. The maximum volume of a chamber is defined when the piston 64, 74 is in either stop position.

Preferably, the actuators 60 and 70 are hydraulic actuators that for example contain oil, or any other suitable liquid, which is preferably incompressible. They may, however, be pneumatic actuators. In the case where the fluid used is compressible, each actuator 60, 70 advantageously includes a volumetric compensator, so as to correct the volume variations of the fluid contained in the chambers due to thermal effects.

The operating principles of the system for opening and closing a door is as follows, in reference to FIGS. 5A and 5B, which very diagrammatically illustrate a system for opening and closing a door mounted, on one hand, on the landing gear 30, and on the other hand, on the door 50.

Figure 5A:
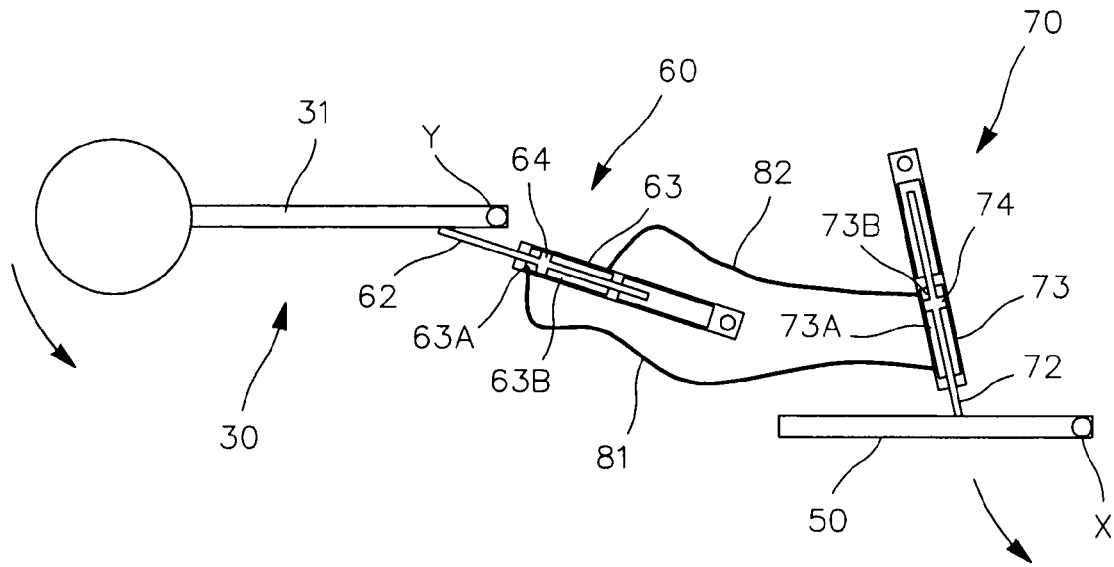
FIGS. 5A and 5B are a diagrammatic cross-sectional illustration of the system according to the preceding embodiment, mounted on the landing gear and on the door, when the landing gear is in (FIG. 5A) and out (FIG. 5B).

In FIG. 5A, the landing gear 30 is in the in position and the door 50 is in the closed position.

The landing gear cylinder 60 is mounted on the landing gear leg 31, in an out configuration of the actuating rod 62. It is connected to the door actuator 70, mounted on the door 50 in an in configuration of the actuating rod 72.

The hoses 81 and 82 ensure fluid communication between the two cylinders 60 and 70.

Figure 5B:
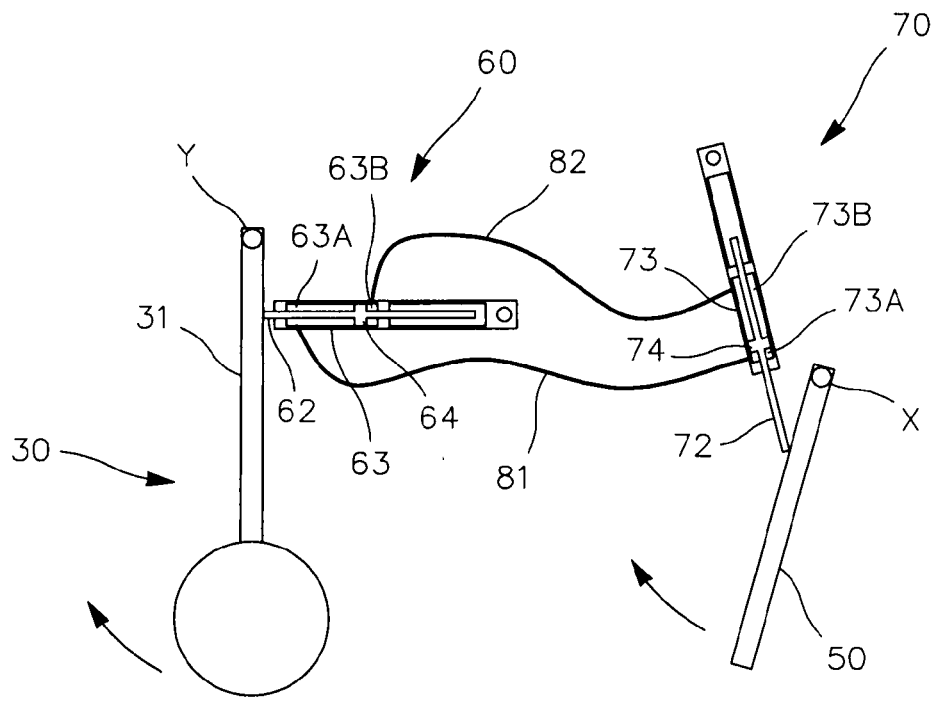

In reference to FIG. 5B, when the landing gear 30 descends under the action of the handler device of the landing gear (not shown), it rotates around its axis of rotation Y and actuates the landing gear actuator 60.

The actuating rod 62 is then moved into its in position. The return of the actuating rod 62 inside the cylinder 63 causes the volume of the front chamber 63A to increase and the volume of the back chamber 63B to decrease. The piston 64 then exerts pressure on the fluid contained in the back chamber 63B, which is moved outside the back chamber 63B. The fluid fills, via the hose 82, the back chamber 73B of the door cylinder 70.

The back chamber 73B of the door cylinder 70 is filled with fluid that exerts, at the same time, pressure on the piston 74. The piston 74 moves in the direction of the exit of the actuating rod 72. In parallel, the fluid contained in the front chamber 73A is moved, via the hose 81, in the front chamber 63A of the landing gear cylinder 60.

Thus, the actuating rod 72 of the door actuator 70 moves into the out position, and causes the door to rotate around its axis X and thus to open.

Conversely, the raising handling of the landing gear 30 causes the landing gear actuator 60 to be actuated and its rod 62 to come out. The movement of the rod 62 causes the movement, in the direction opposite the direction previously described, of the pistons 64 and 74, and of the fluids contained in the respective chambers. The actuating rod 72 of the door cylinder 70 is then moved in the in direction. Thus, the door actuator 70 exerts a pull force on the door 50 and causes it to close.

In one alternative embodiment of the invention not shown, the landing gear cylinder 60 is oriented such that the actuating rod 62 is in the in position, and no longer out as before, when the landing gear 30 is raised.

Thus, the descent of the landing gear 30 causes the actuation of the actuator 60 by moving the actuating rod 62 into its out position.

The hose 81 is arranged so as to ensure fluid communication between the front chamber 63A of the landing gear cylinder 60 with the back chamber 73B of the door 70. Likewise, the hose 82 ensures fluid communication between the back chamber 63B of the landing gear actuator 60 with the front chamber 73A of the door actuator 70.

The operating principle is then similar to that previously described.

Moreover, it should be noted that the technical characteristics (diameter of the cylinder, travel of the piston) can be adapted for each actuator 60, 70 potentially as a function of the space constraints of the compartment 20. Thus, the travel of the pistons 64, 74 may not be identical, the diameter of the cylinders and 73 is then dimensioned such that the fluid volume displaced in a first hose is always identical to the volume displaced in the second hose.

The invention claimed is:

1. A system for opening and closing a door of a compartment for a landing gear of an aircraft, said system comprising:
   a connection mechanism between the landing gear and the door configured to ensure opening of the door when the landing gear comes out of said compartment and closing of the door when the landing gear goes back in said compartment,
   wherein the connection mechanism includes a first actuator mounted on the landing gear and a second actuator mounted on the door, the two actuators being connected to each other by at least one fluid communication device such that movement of the landing gear actuates the first actuator which causes fluid from the first actuator to actuate the second actuator, and
   wherein the first actuator, the second actuator and the fluid communication device together form at least one closed fluid circuit.

2. The system according to claim 1, wherein the second actuator is also mounted on the landing gear compartment.

3. The system according to claim 1, wherein the second actuator is arranged substantially perpendicular, locally, to the door when said door is closed.

4. An aircraft including a system for opening and closing a door according to claim 1.

5. The system according to claim 1, wherein the at least one closed fluid circuit is a passive circuit which responds to the movement of the landing gear.

6. The system according to claim 1, wherein the first and second actuators are two-way cylinders.

7. The system according to claim 6, wherein each cylinder of said first and second actuators includes a front chamber and a back chamber, wherein the front chamber receives an actuating rod, wherein a first pipe ensures fluid communication between the front chamber of the first actuator and the back chamber of the second actuator, and wherein a second pipe ensures fluid communication between the back chamber of the first actuator and the front chamber of the second actuator.

8. The system according to claim 6, wherein the first and second actuators include a double rod.

9. The system according to claim 6, wherein each cylinder of said first and second actuators includes a front chamber and a back chamber, wherein the front chamber receives an actuating rod, wherein a first pipe ensures fluid communication between said front chambers, and wherein a second pipe ensures communication between said back chambers.

10. The system according to claim 9, wherein the pipes are flexible.

11. The system according to claim 9, wherein each actuator comprises a fastening portion that extends along an axis of symmetry of the cylinder from the back chamber.

12. The system according to claim 9, wherein a sum of volumes of the first pipe and the first chambers is equal to a sum of the volumes of the second pipe and the second chambers.

* * * * *